(12) United States Patent
Sato (10) Patent No.: US 7,200,179 B2
(45) Date of Patent: Apr. 3, 2007

(54) DATA TRANSMISSION METHOD, DATA RECEPTION METHOD, DATA TRANSPORT METHOD, DATA TRANSMISSION DEVICE, DATA RECEPTION DEVICE, DATA TRANSFER SYSTEM, AND COMMUNICATION TERMINAL

(75) Inventor: Masanori Sato, Tokyo (JP)

(73) Assignee: Sony Erission Mobile Communications Japan, Inc., Tokyo (JP)

( * ) Notice: Subject to any disclaimer, the term of this patent is extended or adjusted under 35 U.S.C. 154(b) by 177 days.

(21) Appl. No.: 10/513,620

(22) PCT Filed: Mar. 5, 2004

(86) PCT No.: PCT/JP2004/002901
§ 371 (c)(1),
(2), (4) Date: Nov. 4, 2004

(87) PCT Pub. No.: WO2004/079959
PCT Pub. Date: Sep. 16, 2004

(65) Prior Publication Data
US 2005/0213638 A1      Sep. 29, 2005

(30) Foreign Application Priority Data
Mar. 7, 2003 (JP) ............................ 2003-062415

(51) Int. Cl.
*H04K 1/10* (2006.01)
*H04L 27/28* (2006.01)
(52) U.S. Cl. .................. 375/260; 370/200; 370/203; 370/209; 375/219; 375/259
(58) Field of Classification Search ............... 375/219, 375/259, 260; 370/200, 203, 209
See application file for complete search history.

(56) References Cited

U.S. PATENT DOCUMENTS 5,469,470 A * 11/1995 Takahashi ................... 375/142

(Continued)

FOREIGN PATENT DOCUMENTS

JP          6-29946          2/1994

(Continued)

OTHER PUBLICATIONS

Bob Pearson, "Complementary Code Keying Made Simple", Application Note 9850, [online]. May 2002.

(Continued)

*Primary Examiner*—Mohammed Ghayour
*Assistant Examiner*—Erin M. File
(74) *Attorney, Agent, or Firm*—Frommer Lawrence & Haug LLP; William S Frommer (57) ABSTRACT

Input data is separated into a first data row and a second data row by a unit of a predetermined symbol. One of a plurality of orthogonal codes is selected in accordance with the separated second data row. The first data row is diffused using the selected code; and the diffused first data row is modulated and transmitted. When received, the signals are individually inversely diffused using the same plurality of orthogonal codes. An inversely diffused signal using a correct orthogonal code is selected and demodulated to obtain a first receiving data row. A second receiving data row corresponding to the correct orthogonal code is obtained; and the first and second receiving data rows are combined to obtain the received data.

12 Claims, 11 Drawing Sheets

U.S. PATENT DOCUMENTS

| | | | |
|---|---|---|---|
| 5,583,884 A | | 12/1996 | Maruyama et al. |
| 5,724,382 A | * | 3/1998 | Maruyama .................. 375/141 |
| 5,962,950 A | * | 10/1999 | Egara et al. ............ 310/313 R |
| 5,983,113 A | * | 11/1999 | Asanuma .................... 455/506 |
| 6,118,774 A | * | 9/2000 | Arai et al. ................. 370/342 |
| 6,556,834 B1 | * | 4/2003 | Kobayashi et al. ......... 455/464 |
| 2002/0141478 A1 | * | 10/2002 | Ozluturk et al. ............ 375/130 |
| 2003/0026200 A1 | * | 2/2003 | Fu et al. ..................... 370/208 |
| 2003/0214932 A1 | * | 11/2003 | Ariyoshi et al. ............ 370/342 |

FOREIGN PATENT DOCUMENTS

| | | |
|---|---|---|
| JP | 7-170210 | 7/1995 |
| JP | 8-204614 | 8/1996 |
| JP | 9-8696 | 1/1997 |
| JP | 2002-152086 | 5/2002 |

OTHER PUBLICATIONS

"Nikkei NETWORK", Dec. 19, 2001, 2002 Nen 1 Gatsugo, pp. 68 to 69.

* cited by examiner

FIG. 5A  User Information 1
         (After mapping) -1

FIG. 5B  Orthogonal Code 1
         (SF16) -1

FIG. 5C  After Diffusion 1
         -1

FIG. 6A  User Information
         (Data Side)

FIG. 6B  User Information
         (Switching Side)

FIG. 6C  Orthogonal Code
         to Be Used

FIG. 6D  Output

DATA TRANSMISSION METHOD, DATA RECEPTION METHOD, DATA TRANSPORT METHOD, DATA TRANSMISSION DEVICE, DATA RECEPTION DEVICE, DATA TRANSFER SYSTEM, AND COMMUNICATION TERMINAL

TECHNICAL FIELD

The present invention relates to a data transmission method, a data reception method, a data transport method, a data transmission apparatus, a data reception apparatus and a data transport system as well as a communication terminal which are suitable to be applied to a wireless transmission of, for example, a CDMA (Code Division Multiple Access) method.

BACKGROUND ART

Hitherto, the CDMA method has been put into a practical use as the efficient wireless transmission. In the CDMA method, transmitting data is diffused using an orthogonal code and is multiplexed to be transmitted. There is a case in which control information (power control information, information for synchronous detection and the like) other than user information (audio data or packet data or the like) is contained in the transmitting data.

Figure 11:
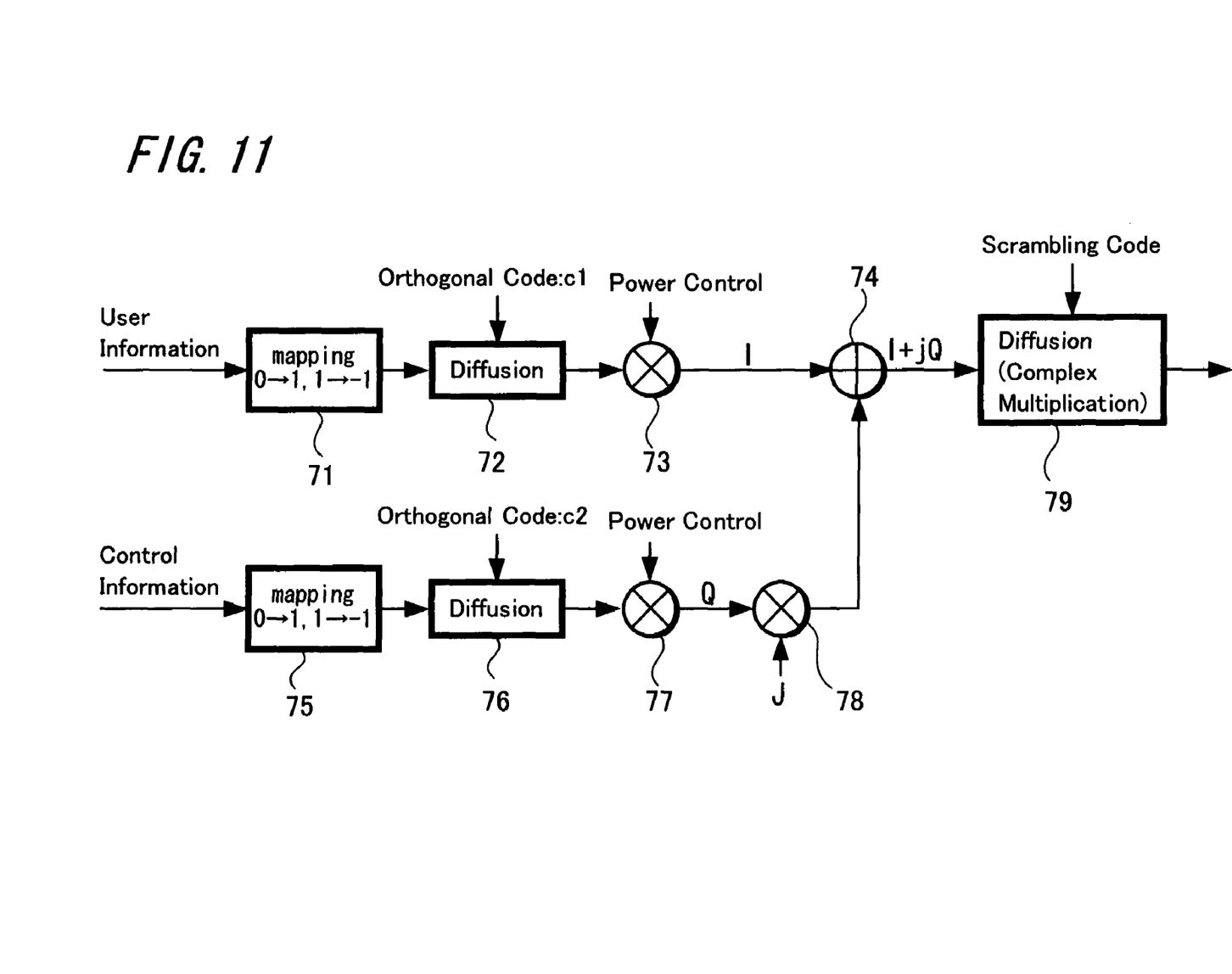
FIG. 11 is a block diagram showing an example of conventional transmission processing.

FIG. 11 is a block diagram showing a conventional example in which wireless transmission processing is performed in the CDMA method by multiplexing user information and control information. First, the user information is supplied to a mapping circuit 71 to perform mapping processing in which data 0 is set to 1 and data 1 is set to −1, and the mapped user information is supplied to a diffusion circuit 72 and is multiplied by an orthogonal code c1 to be diffused. The diffused user information is supplied to a power amplifier 73 to perform amplification processing according to transmission power and is supplied to a composing unit 74.

On the other hand, the control information is also supplied to a mapping circuit 75 to perform mapping processing in which data 0 is set to 1 and data 1 is set to −1, and the mapped control information is supplied to a diffusion circuit 76 and is multiplied by an orthogonal code c2 to be diffused. The diffused control information is supplied to a power amplifier 77 to perform amplification processing according to transmission power, and an amplified signal is supplied to the composing unit 74 after made into a complex number in a complexing circuit 78.

In the composing unit 74, the supplied user information and control information as information of I channel and that of Q channel respectively are made into one system of information (I+jQ), in which the above user information and control information are orthogonally composed, and the information (I+jQ) output from the composing unit 74 is supplied to a scramble circuit 79. In the scramble circuit 79, a complex multiplication is performed using a scrambling code to be made into a scrambled signal, and the scrambled signal is transmitted.

Figure 12:
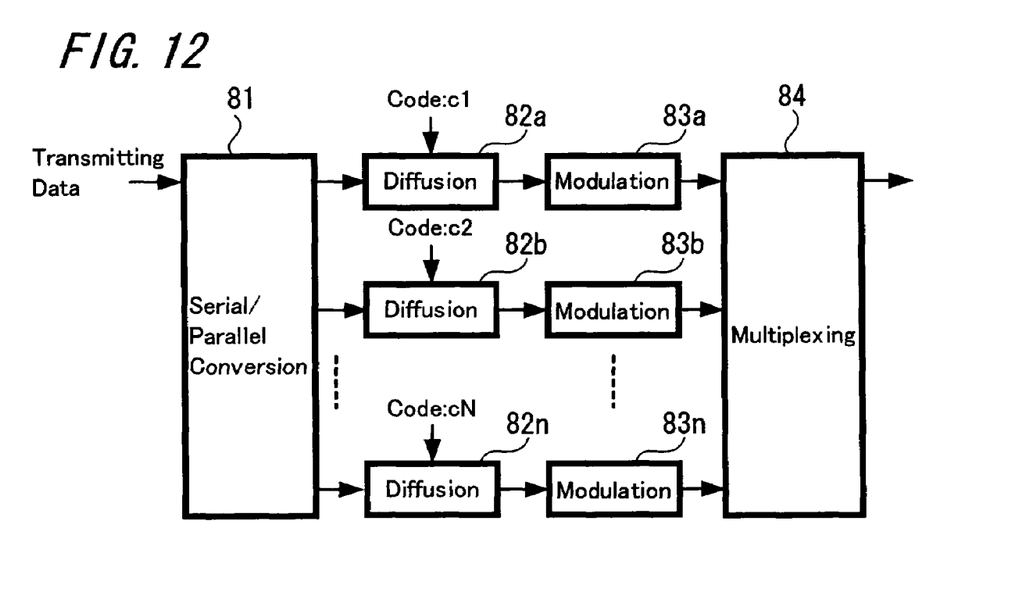
FIG. 12 is a block diagram showing an example of conventional transmission processing of multi-codes.
Figure 13:
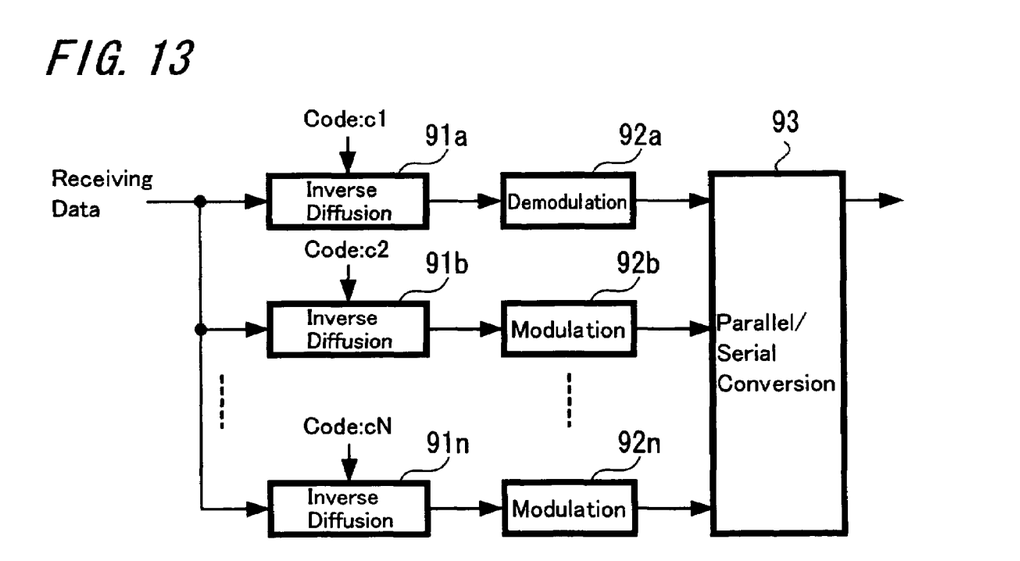
FIG. 13 is a block diagram showing an example of conventional reception processing of the multi-codes.

When it is tried to raise a transmission rate in such CDMA method, a method of multiplexing transmitting data using, for example, a plurality of orthogonal codes has been known. FIG. 12 is a diagram showing an example of a configuration on a transmitting side to which conventional multi-code processing for multiplexing the transmitting data using a plurality of orthogonal codes is applied, and FIG. 13 is a diagram showing an example of a configuration on a reception side for the signal thereof. Processing of mapping, power control and the like is omitted in FIGS. 12 and 13.

An explanation is made to the configuration of FIG. 12; transmitting data is divided into a plurality of data series in a serial/parallel converter 81. Hereupon, it is assumed that the data is divided into n (n is an arbitrary integer and the number of multiplexing) series; and the n series of data are supplied to different diffusion circuits 82a, 82b, - - - and 82n respectively and are multiplied by different orthogonal codes c1, c2, - - - and cN respectively to perform diffusion processing multiplying. The transmitting data which are diffused by the respective diffusion circuits 82a, 82b - - - and 82n are provided for different modulation circuits 83a, 83b, - - - and 83n respectively to perform modulation processing for transmission, and the modulated transmitting data are supplied to a multiplexing circuit 84 to be made into multiplexed transmitting data and the transmitting data is wirelessly transmitted.

FIG. 13 is a diagram showing an example of a configuration of receiving a signal which is thus multiplexed and wirelessly transmitted. Received data is supplied to a plurality of inverse diffusion circuits 91a, 91b, - - - and 91n. Those inverse diffusion circuits 91a through 91n are n pieces of circuits which are prepared to correspond to the multiplexing number of n at the time of transmission, and data are multiplied by the same diffusion codes c1, c2, - - - and cN as those at the time of transmission in the respective inverse diffusion circuits 91a, 91b, - - - and 91n to perform inverse diffusion processing on the data series which are diffused using the respective diffusion codes. The receiving data obtained from the inverse diffusion processing for each series of data are supplied to different demodulation circuits 92a, 92b, - - - and 92n respectively to perform demodulation processing for receiving data, and each series of the demodulated receiving data is composed into one data series in a parallel/serial conversion circuit 93 to be made into the receiving data.

With performing the transmission processing of the multiplexed signal using the plurality of orthogonal codes shown in those FIGS. 12 and 13, it is possible to increase an amount of data to be transmitted as the number of diffusion codes to be used increases, and the transmission rate can be raised to that extent. The following reference discloses an example of specification in which transmission is performed after multiplexing by the plurality of orthogonal codes.

"3G TS 25.211", issued by 3GPP (Dec., 1999), V3.1.1 Technical Specification $3^{rd}$ Generation Partnership Project; Technical Specification Group Radio Access Network; Physical channels and mapping of transport channels onto physical channels, the $20^{th}$ page.

However, when wireless transmission is performed in the manner shown in FIGS. 12 and 13, there is a problem in which transmitting power is required as much as the number of orthogonal codes to be used. In other words, when two orthogonal codes are used, twice as much transmitting power is required, and when four orthogonal codes are used, the transmitting power four times as much is required, and therefore, there has been a problem in which a great amount of transmitting power is necessary as a whole in proportion to the number of orthogonal codes to be used.

In order to avoid this problem, there is a method of, for example, raising a transmission rate by shortening a cycle of an orthogonal code. However, when the cycle of the orthogonal code is shortened, noise characteristics become deteriorated to that extent, and therefore, it becomes necessary to increase the transmitting power, after all.

Further, although it is also considered to raise the transmission rate by employing a modulation method of using multiple values, the noise characteristics also deteriorate in this case and therefore, the transmitting power needs to increase after all. When a QPSK (Quadrature Phase Shift Keying) method, for example, has been employed as the modulation method, it can also be considered to switch over to a multi-value modulation such as a 16QAM (Quadrature Amplitude Modulation) method. However, since a distance between signals becomes short when switching over to the multi-value modulation, the noise characteristics become deteriorated and the transmitting power needs to increase in order to secure a communication quality.

Particularly, in case of a communication terminal such as a mobile phone unit which is operated using a battery, such large increase in transmission power is not desirable due to the reason that sustaining time of the battery of the terminal may be shortened.

The present invention is made in view of the above problems and aims to raise the transmission rate efficiently without increasing the transmission power.

DISCLOSURE OF THE INVENTION

According to the present invention, data input on a transmitting side is separated into a first data row and a second data row by the unit of predetermined symbol; one code is selected from a plurality of orthogonal codes prepared in advance in accordance with the separated second data row; the first data row is diffused by the selected code; and the diffused first data row is transmitted after modulating by a predetermined modulation method.

Subsequently, on a receiving side, a transmitted signal is received; an inverse diffusion is performed individually using the same plurality of orthogonal codes as the above described orthogonal codes; a signal on which the inverse diffusion is performed using a correct orthogonal code is selected from respective receiving signals on which the inverse diffusion is performed; the selected signal is demodulated by a predetermined demodulation method to obtain the first receiving data row; the second receiving data row corresponding to the selected correct orthogonal code is obtained; and both the first receiving data row and the second receiving data row are composed to obtain the receiving data.

With the above configuration, only the first data row is transmitted as the data which is transmitted on a transmission path, and the second data row can be obtained on the receiving side based on the selection of the orthogonal code which has diffused the first data row. Therefore, the first and second data rows can be obtained on the receiving side only by performing processing of transmitting the first data row; the transmission power becomes unnecessary with respect to the second data row; and a transmission rate can be raised with less transmission power, so that efficient transmission can be performed. Particularly, when being included as a transmission apparatus driven by a battery, this configuration is efficient to make sustaining time of the battery longer since there is no need to raise the transmitting power. Moreover, there is no need to make the modulation method or the like multi-valued though the transmission rate can be increased, so that it is possible to relax a restriction (or to be made equal to a restriction of a conventional low transmission rate) on an analog portion.

BEST MODE FOR CARRYING OUT THE-INVENTION

Hereinafter, embodiments of the present invention are explained referring to FIGS. 1 through 10.

Figure 1:
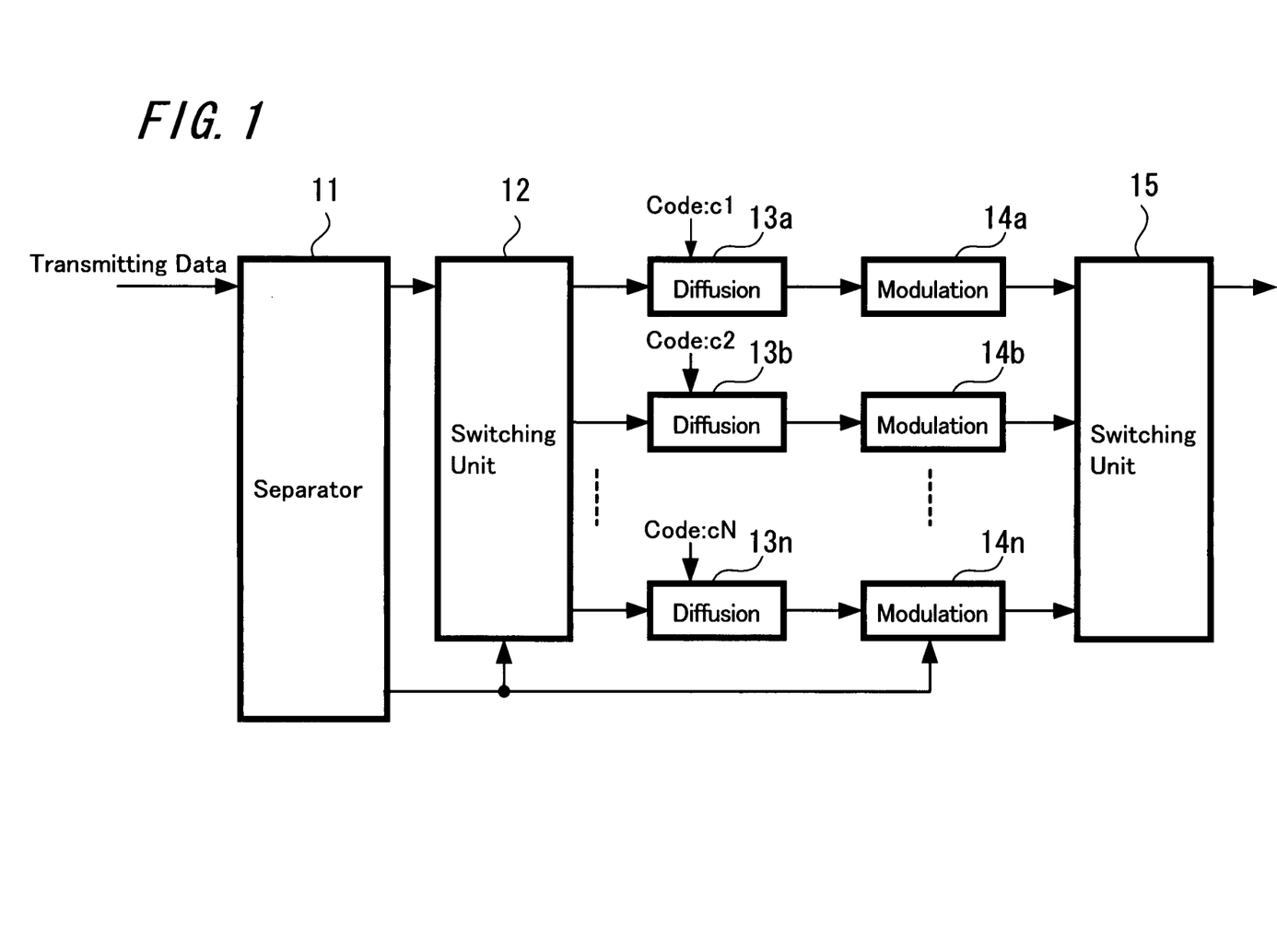
FIG. 1 is a block diagram showing an example of the principle and configuration on a transmitting side according to an embodiment of the present invention.
Figure 2:
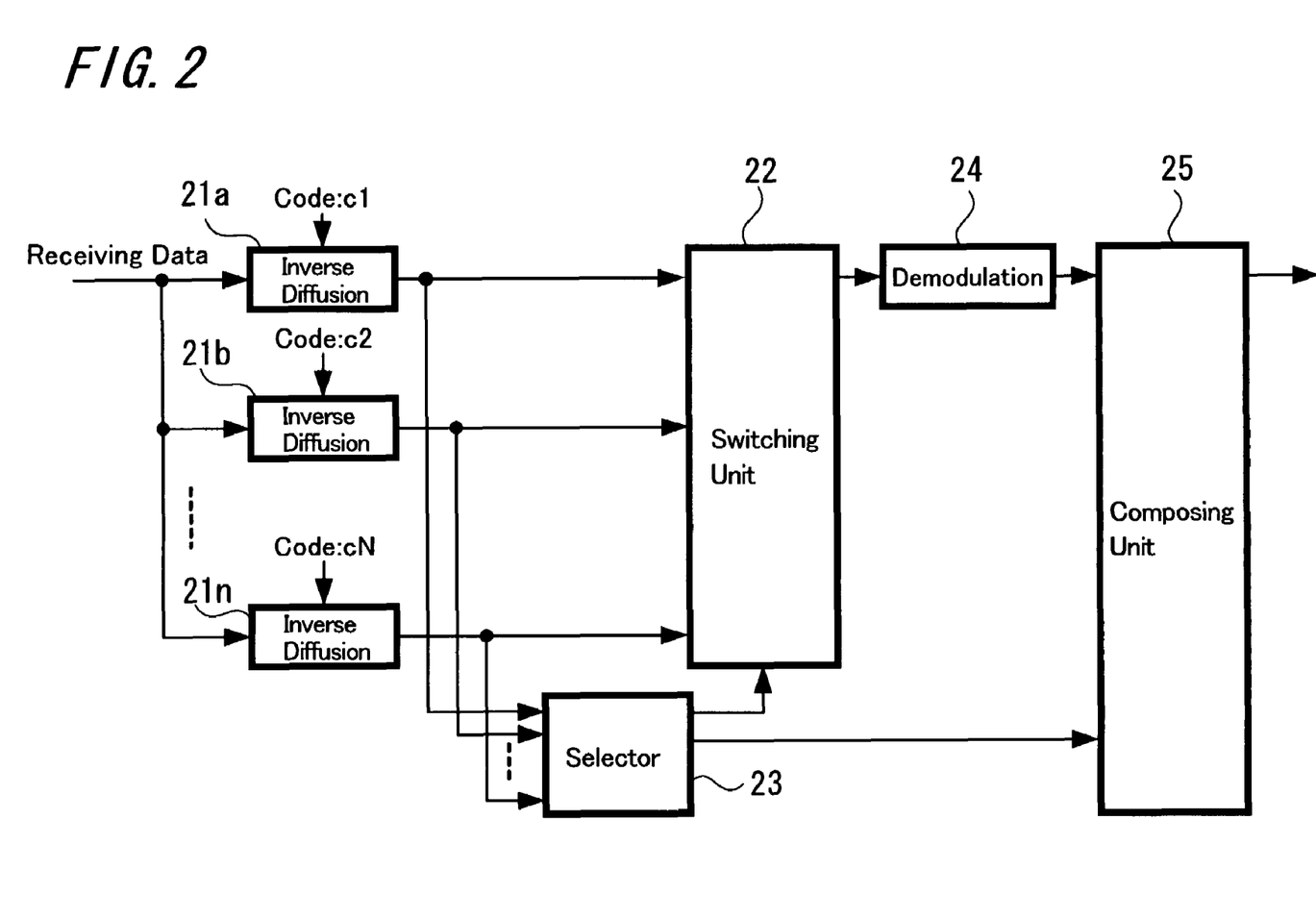
FIG. 2 is a block diagram showing an example of the principle and configuration on a receiving side according to an embodiment of the present invention.

First, a principle of transmission according to an embodiment of the present invention is explained referring to FIGS. 1 and 2. FIG. 1 is a diagram showing the principle and configuration on a transmitting side, and FIG. 2 is a diagram showing the principle and configuration on a receiving side.

An explanation is made to the principle and configuration on the transmitting side shown in FIG. 1; transmitting data is supplied to a separator 11. The supplied transmitting data is separated into two systems in the separator 11. For example, in case of the transmitting data in which one unit (one symbol) includes four bits, it is separated into two bits each, and one two-bit data is supplied to a switching unit 12. Further, the other two-bit data is supplied to the switching units 12 and 15 as switching control information.

The one two-bit data supplied to the switching unit 12 is supplied to any one of n pieces (n is an integer of two or more) of diffusion circuits 13a, 13b, - - - and 13n. Hereupon, since the switching control information has two bits, n becomes four at the maximum and the two-bit data is supplied to a diffusion circuit of a series which is selected based on this switching control information. Moreover, since this switching control information is the two-bit data separated from the transmitting data, the series selected by the switching unit 12 changes each time when the transmitting data of one symbol (four bits) is supplied.

In the respective diffusion circuits 13a, 13b, - - - and 13n, different orthogonal codes c1, c2, - - - and cN are prepared and the two-bit data is multiplied by respective orthogonal codes to be diffused. Each of the orthogonal codes c1, c2, - - - and cN is a code prepared in advance, and a cycle of each code is set to be equal. The data which is diffused in each of the diffusion circuits 13a, 13b, - - - and 13n is supplied respectively to different modulation circuits 14a, 14b, - - - and 14n to be modulated for transmission and the modulated data is supplied to the switching unit 15. The switching unit 15 is a circuit to select one among n systems of data which are supplied to the switching unit 15; a system to be selected is controlled by the switching control information (the other two-bit data) which is supplied from the separator 11; and the same system as that selected by the switching unit 12 is selected. Then, the data selected by the switching unit 15 is transmitted wirelessly.

Next, an explanation is made to the configuration of the receiving system shown in FIG. 2; receiving data is supplied to n pieces (n is an integer of two or more and is the same as the number of systems n on the transmission side) of inverse diffusion circuits 21a, 21b, - - - and 21n. In the respective inverse diffusion circuits 21a, 21b - - - and 21n, the same orthogonal codes c1, c2, - - - and cN as those in the diffusion circuits 13a through 13n on the transmission side are prepared, and the receiving data is multiplied by each orthogonal code in each of the inverse diffusion circuits 21a, 21b, - - - and 21n to be inversely diffused. The inversely diffused receiving data is supplied to a switching unit 22 and a selector 23. In the selector 23, a system of receiving data in which the inverse diffusion is correctly performed is selected by the unit of one symbol from the supplied n systems of receiving data; two-bit data is generated based on the selected system; and the two-bit data is supplied to the switching unit 22 as the switching control information. Further, the two-bit data generated in the selector 23 is supplied to a composing unit 25 as the receiving data.

In the switching unit 22, based on the supplied switching control information one system of receiving data is selected from the receiving data which are inversely diffused in the inverse diffusion circuits 21a, 21b, - - - and 21n. Hereupon, a system of receiving data judged by the selector 23 that the inverse diffusion has been performed correctly is selected in the switching unit 22 to be output. The receiving data output from the switching unit 22 is supplied to a demodulation unit 24 to perform demodulation processing which corresponds to the modulation processing performed at the time of transmission. Here, data of two bits per one symbol is obtained from the demodulation. The receiving data of two bits per one symbol obtained from the demodulation is supplied to the composing unit 25. In the composing unit 25, the data of two bits per one symbol supplied from the demodulation unit 24 and the data of two bits per one symbol supplied from the selector 23 are composed to obtain the data of four bits per one symbol, and the data of four bits per one symbol is made to be the receiving data.

FIG. 3 is a diagram showing an example of a transmission state when transmission and reception are performed base on the configurations shown in FIGS. 1 and 2. In this example, four orthogonal codes c1, c2, c3 and c4 are prepared as the orthogonal codes to be used for diffusing transmitting data at a time of transmission and signals are transmitted with predetermined transmitting power, and the transmitting power for each of the orthogonal codes c1, c2, c3 and c4 is respectively shown in FIGS. 3A, 3B, 3C and 3D. A period of a symbol where each transmitting power is high indicates that a signal diffused by the orthogonal code is being transmitted. For example, when the other two bits separated by the separator 11 on the transmitting side is 00, the diffusion using the orthogonal code c1 is selected; when those are 01, the diffusion using the orthogonal code c2 is selected; when those are 10; the diffusion using the orthogonal code c3 is selected; and when those are 11, the diffusion using the orthogonal code c4 is selected.

Further, FIGS. 3E, 3F, 3G and 3H show the receiving power of the signal on which the inverse diffusion is performed by preparing four orthogonal code c1, c2, c3 and c4 on the receiving side. A period where the receiving power of the inversely diffused signal is high coincides with the period where the transmitting power of the signal diffused by the same orthogonal code is high, and it is judged by the selector 23 on the receiving side that the signal in the period where the receiving power is high is the signal inversely-diffused correctly and selection information of the orthogonal code changes by the unit of one symbol as shown in FIG. 3I.

Figure 3A:
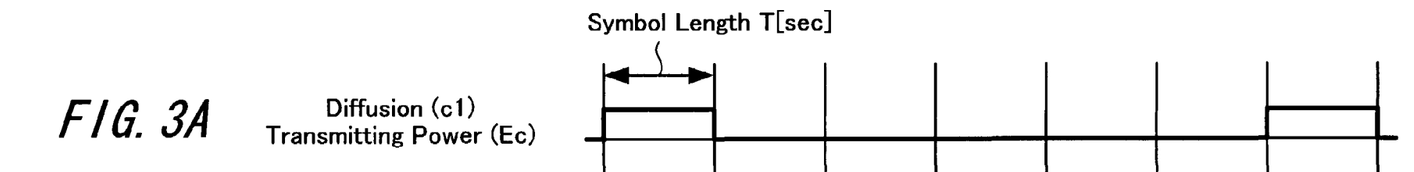
FIGS. 3A to 3I are characteristic views showing an example of a transmission state according to an embodiment of the present invention.
Figure 3B:
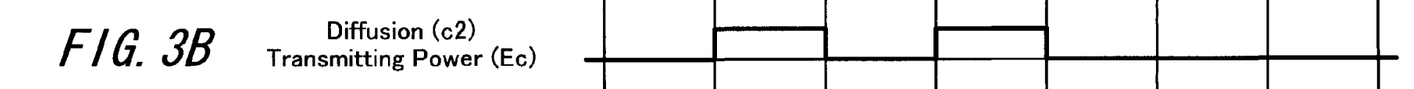
Figure 3C:
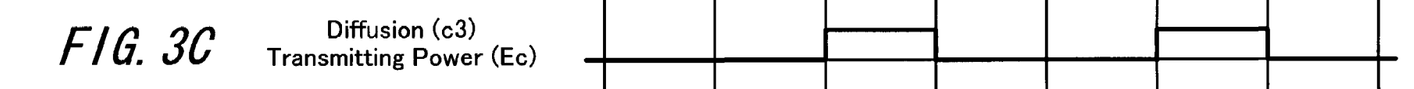
Figure 3D:
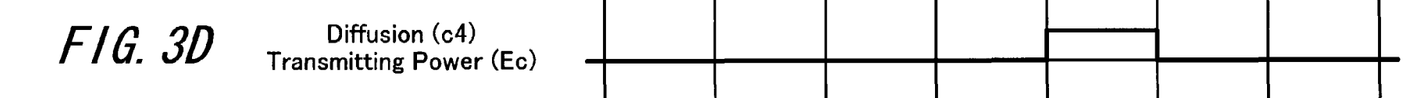
Figure 3E:
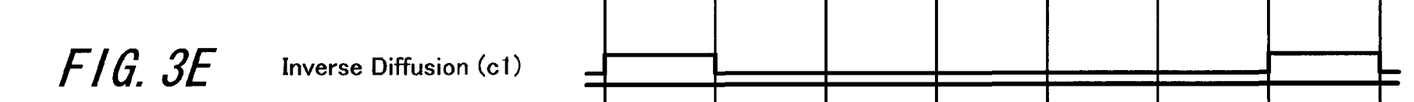
Figure 3F:
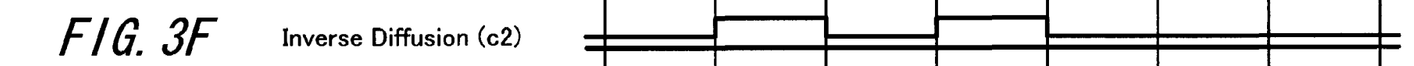
Figure 3G:
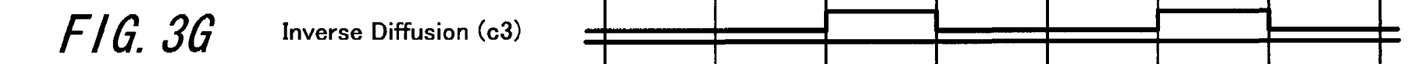
Figure 3H:
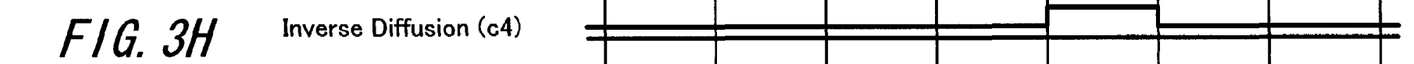
Figure 3I:
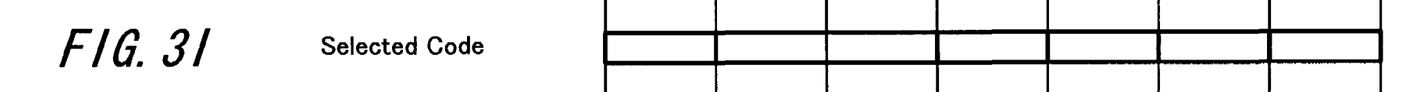

On the receiving side, the selection information on the orthogonal code shown in FIG. 3I is used as the receiving data of two bits within the four bits per one symbol, so that the data of four bits can be received for each symbol. For example, in case that four orthogonal codes are selected from the data of two bits per one symbol on the transmitting side as described above, 00 is set as the two-bit data when the signal inversely diffused by the orthogonal code c1 is selected; 01 is set as the two-bit data when the signal inversely diffused by the orthogonal code c2 is selected; 10 is set as the two-bit data when the signal inversely diffused by the orthogonal code c3 is selected; and 11 is set as the two-bit data when the signal inversely diffused by the orthogonal code c4 is selected.

Since the selection information of the orthogonal code is thus used as the receiving data, the data of four bits per one symbol can be obtained as the receiving data as a result, though only two bits per one symbol are transmitted on a wireless transmission path. Therefore, even in the case where transmission power is restricted considerably, a transmission rate can be raised efficiently.

Figure 4:
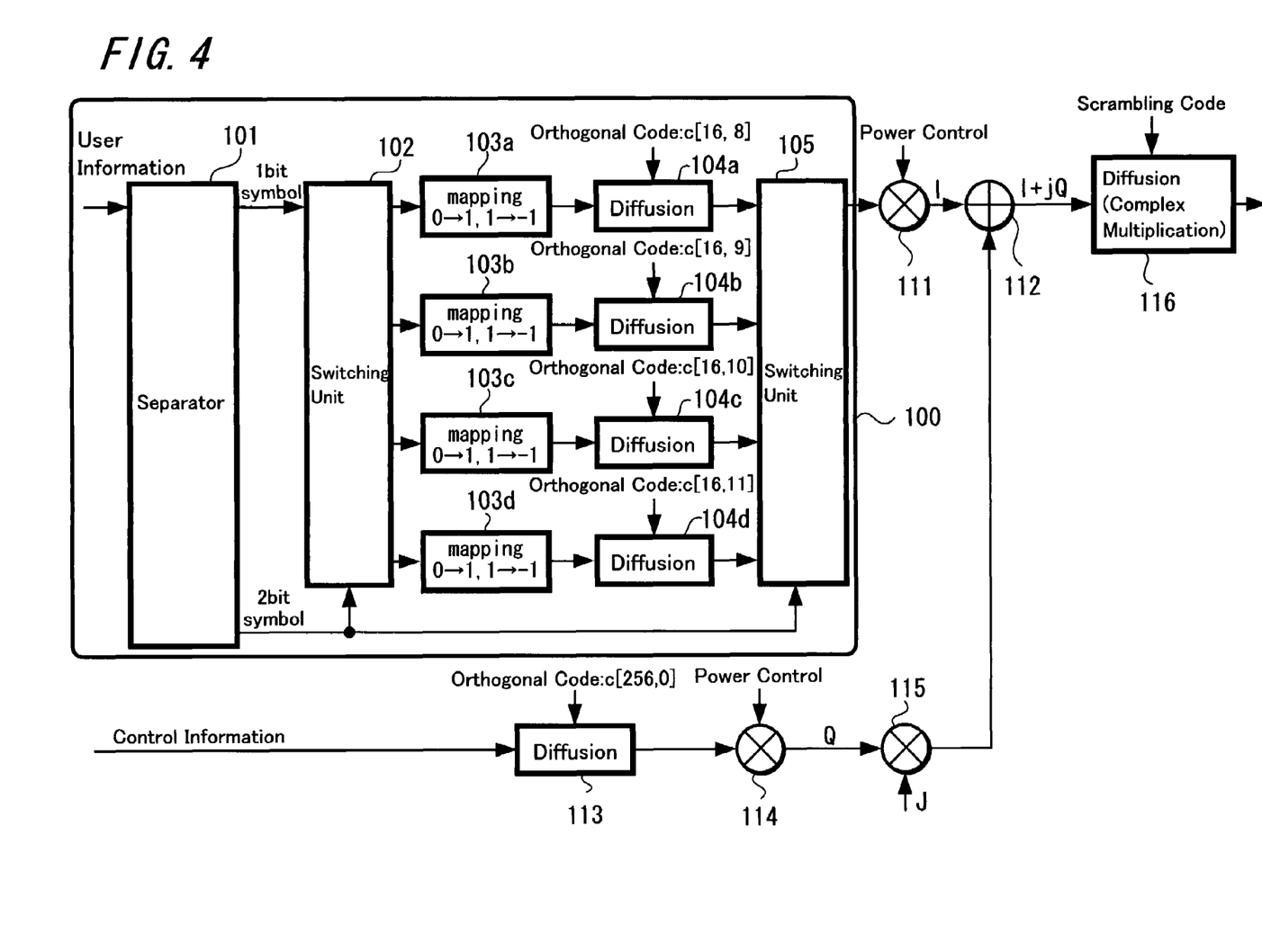
FIG. 4 is a block diagram showing an example of a transmitting configuration according to an embodiment of the present invention.

Next, a configuration of transmission processing according to an embodiment of the present invention will be explained. FIG. 4 is a diagram showing an example of a configuration of a transmission apparatus according to this embodiment. An explanation is made based on FIG. 4; in this example user information and control information are composed to be wirelessly transmitted. A user information diffusion unit 100 supplies inputted user information to a separator 101 to be separated into data of one bit per one symbol and data of two bits per one symbol. The data of one bit/one symbol which is separated in the separator 101 is supplied to a switching unit 102 to be supplied to any one of four mapping circuits 103a through 103d. The data of two bits per one symbol which is separated in the separator 101 is used as information to select from those mapping circuits 103a through 103d.

Four mapping circuits 103a through 103d perform: mapping into 1 when the supplied data is data of 0 and mapping into −1 when the supplied data is data of 1. Outputs of the mapping circuits 103a through 103d are supplied to different diffusion circuits 104a through 104d respectively and are multiplied by different orthogonal codes respectively in the respective different diffusion circuits 104a through 104d to perform diffusion processing.

Hereupon, data is multiplied by an orthogonal code c [16, 8] in the diffusion circuit 104a; data is multiplied by an orthogonal code c [16, 9] in the diffusion circuit 104b; data is multiplied by an orthogonal code c [16, 10] in the diffusion circuit 104c; and data is multiplied by an orthogonal code c [16, 11] in the diffusion circuit 104d. Note that, with respect to the numbers given to each orthogonal code, the first number 16 denotes a cycle of the orthogonal code in which there exist sixteen kinds for the orthogonal code of 16 cycles, and the subsequent number (in this case, 8, 9, 10, and 11) denotes what number in the sixteen kinds (in other words, the $8^{th}$, the $9^{th}$, the $10^{th}$, and the $11^{th}$) the orthogonal code is. When a plurality of orthogonal codes are used, it is necessary to select a combination of orthogonal codes by which orthogonality is not impaired; however the combination thereof is not limited to the example described above.

The user information (diffused signal) which is diffused by the multiplication of the orthogonal code in each of the diffusion circuits 104a through 104d is supplied to a switching unit 105, so that one of the outputs from the diffusion circuits can be selected. The data of two bits per one symbol separated in the separator 101 is also used in the switching unit 105 similarly to the switching unit 102, and synchronized switching is performed simultaneously in the two switching units 102 and 105. The diffusion signal which is selected by the switching unit 105 is supplied to a power amplifier 111 as an output of the user information diffusion unit 100; amplification processing is performed in accordance with transmission power which is set at that time, and the amplified signal is supplied to a composing unit 112.

Further, with respect to the control information, the information is multiplied by an orthogonal code c [256, 0] in a diffusion circuit 113 to be diffused; the diffused signal is supplied to a power amplifier 114; amplification processing is performed in accordance with transmission power which is set at that time; and the amplified signal is supplied to the composing unit 112 through a complexing circuit 115.

In the composing unit 112, the diffused user information is set as a signal of I channel and the diffused control information is set as a signal of Q channel to generate a composite signal (I+jQ); the composite signal is supplied to a scramble circuit 116; complex multiplication is performed using a scrambling code 116 to generate a scrambled transmitting signal; and the transmitting signal is transmitted wirelessly.

Figures 5, 5A, 5B:
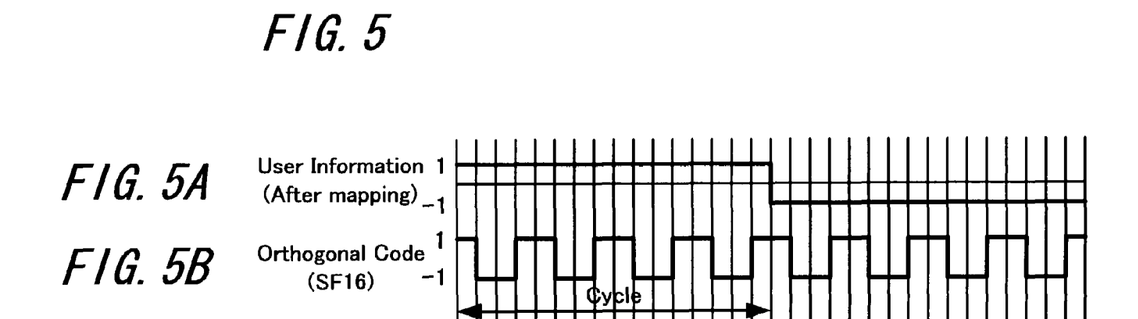
FIGS. 5A to 5C are explanatory views showing an example of a diffusion state according to the example of FIG. 4.
Figure 5C:
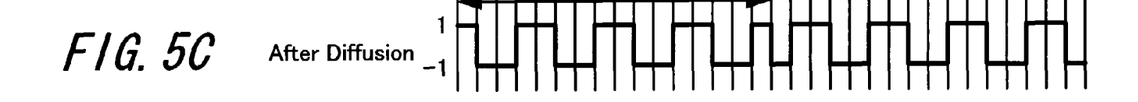

FIG. 5 is a diagram showing an example of a diffusion processing state in the diffusion circuit within the user information diffusion unit 100. For example, when user information after mapping is obtained as shown in FIG. 5A, the user information is multiplied by an orthogonal code of a cycle SF 16 shown in FIG. 5B to obtain a signal after diffusion, as shown in FIG. 5C.

Figure 6A:
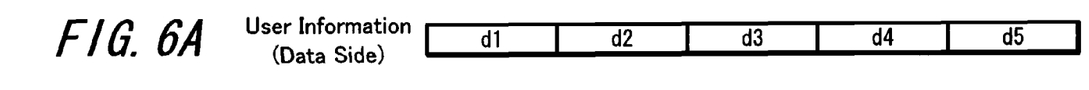
FIGS. 6A to 6D are explanatory views showing an example of transmission processing according to an embodiment of the present invention.
Figures 6B, 6C:
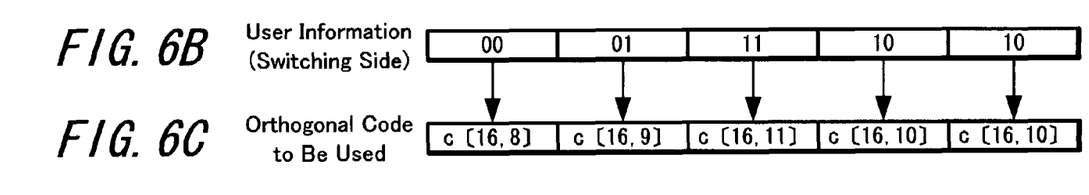
Figure 6D:
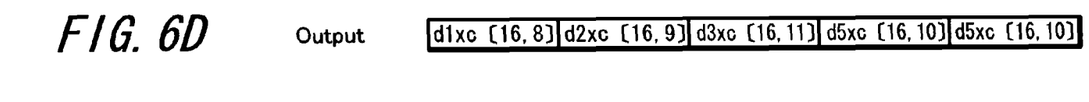

FIG. 6 is a diagram showing a state in which data is transmitted in this manner. FIG. 6A is a diagram showing user information on the transmitting side, which is separated in the switching unit 102, by the unit of one symbol (one bit) and FIG. 6B is a diagram showing the user information, which is used as the switching information separated in the switching unit 102, by the unit of one symbol (two bits). As shown in FIG. 6C, an orthogonal code to be used is determined according to the two-bit data as the switching information shown in FIG. 6B. Since the orthogonal code to be used is determined, the user information shown in FIG. 6A is multiplied by the orthogonal code shown in FIG. 6C to obtain output data (FIG. 6D).

Next, an explanation is made to an example of a configuration to receive a signal which is transmitted in this manner.

Figure 7:
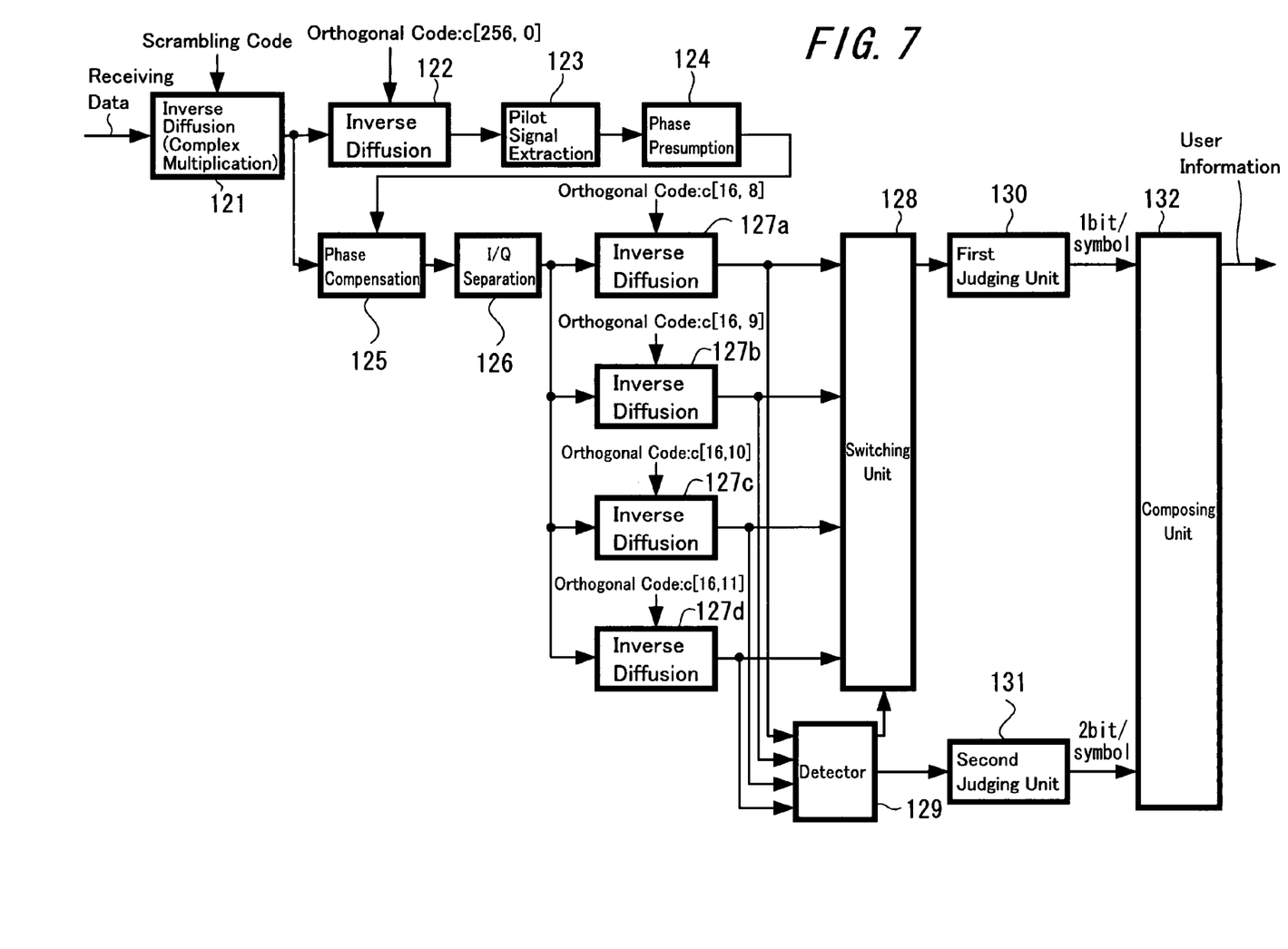
FIG. 7 is a block diagram showing an example (first example) of a receiving configuration according to an embodiment of the present invention.

First, a first example of a configuration for the reception is explained referring to FIG. 7. Receiving data which is obtained by receiving a wireless signal is supplied to a descramble circuit 121 and a complex multiplication is performed thereon using a scrambling code to obtain descrambled receiving data. The obtained receiving data is supplied to an inverse diffusion circuit 122; inverse diffusion is performed by multiplying the data by the orthogonal code c [256, 0] which has been used for the diffusion of the control information on the transmitting side, and the inversely diffused signal is supplied to a pilot signal extraction unit 123 to extract a pilot signal contained in the control signal. Based on the extracted pilot signal, a phase of the receiving signal is presumed in a phase presumption unit 124.

Further, the receiving data which is descrambled in the descramble circuit 121 is supplied to a phase compensation unit 125, and phase compensation processing of the receiving data is performed based on the phase presumed by the phase presumption unit 124. Then, the receiving data whose phase is compensated is supplied to an orthogonal component separator 126 to extract an I-component among orthogonalized components. The extracted I-component is supplied to four inverse diffusion circuits 127a through 127d. In those four inverse diffusion circuits 127a through 127d, the same four orthogonal codes c [16, 8], c [16, 9], c [16, 10] and c [16, 11] as the four orthogonal codes which have been used on the transmitting side are prepared to perform inverse diffusion processing of multiplying individually the receiving data by those codes in each of the inverse diffusion circuits 127a through 127d.

The four systems of receiving data to which the inverse diffusion is performed individually are supplied to a switching unit 128 and only one system of receiving data is selected. In order to perform this selection, the receiving data output from each of inverse diffusion circuits 127a through 127d is supplied to a detector 129 to judge which one among those four systems is the receiving data having been inversely diffused correctly, and the judged system of receiving data is made to be selected in the switching unit 128. This detection in the detector 129 and this selection in the switching unit 128 are performed by the unit of one symbol.

The receiving data selected in the switching unit 128 is supplied to a first judging unit 130 and demodulation processing to judge the receiving data of one bid per one symbol is performed, and then the judged one bit/one symbol is supplied to a composing unit 132.

Further, information on the correct receiving data series which is detected in the detector 129 is supplied to a second judging unit 131, and based on the information of the correct receiving data series, data of two bits per one symbol is obtained from the orthogonal code which has been used for the inverse diffusion of that receiving data. The processing of obtaining this data of two bits per one symbol corresponds to that on the transmitting side of the two-bit data as the switching information of the orthogonal code and the orthogonal code to be used, and therefore, the original data of two bits/one symbol can be obtained based on the orthogonal code.

The data of two bits/one symbol obtained in the second judging unit 131 is supplied to the composing unit 132. In the composing unit 132, the data of one bit/one symbol supplied from the first judging unit 130 and the data of two bits/one symbol supplied from the second judging unit 131 are composed to obtain receiving data of three bits per one symbol. The data of three bits/one symbol is output as the received user information.

Figure 8:
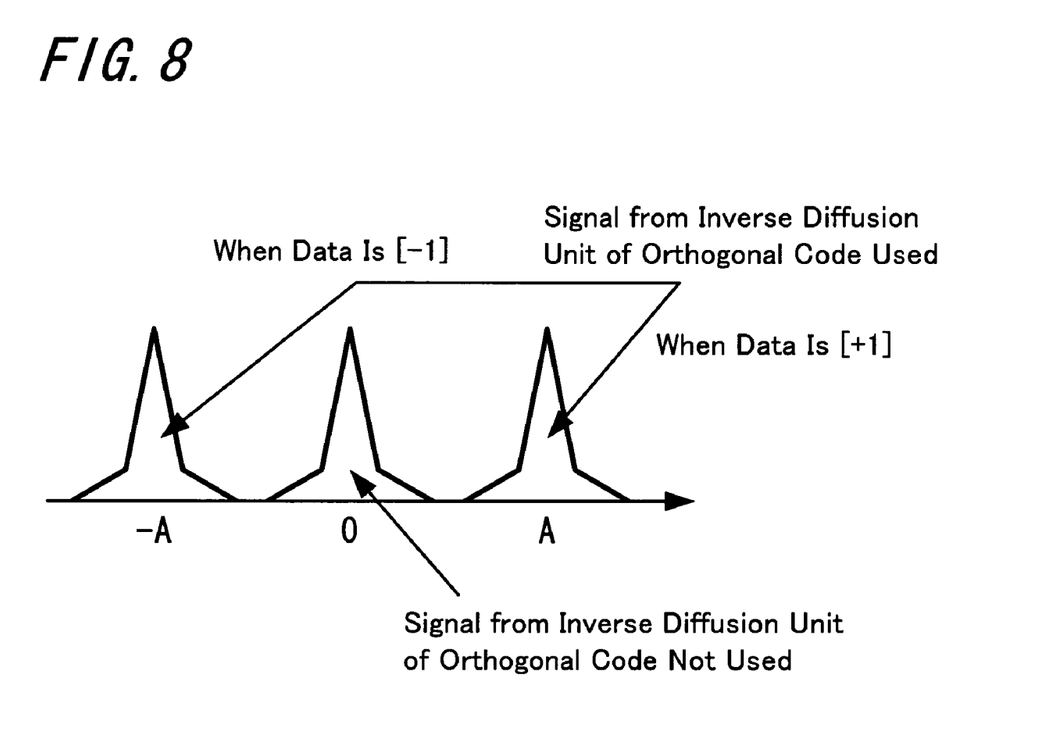
FIG. 8 is a characteristic view showing an example of a reception state according to the example of FIG. 7.

Hereupon, an explanation is made to the detection (judgment) processing in the detector 129; information supplied to the detector 129 of the configuration shown in FIG. 7 is a scalar quantity. Since each orthogonal code is orthogonal to each other, an output other than a code which is originally used becomes zero. However, since noise exists in the received signal, the output does not become zero completely. Accordingly, signals from a code which is used and from a code which is not used are distributed as shown in FIG. 8, in which the signal from the inverse diffusion unit whose orthogonal code is not used is distributed in the vicinity of 0; and with respect to the signal from the inverse diffusion unit whose orthogonal code is used, the signal is distributed in the vicinity of a specific value A when data is [+1] and the signal is distributed in the vicinity of a value −A having a reverse sign to the specific value A when data is [−1]. The value A changes depending on a gain in a transmission path or transmitting power. Since it is not possible to identify at this point of time that a signal being transmitted is ±1, an absolute value is taken to identify the signal, for example. By doing so, the signal whose orthogonal code is used is distributed in the vicinity of the value A, and the judgment (detection) of the code which is used becomes possible by selecting the maximum value thereof.

Figure 9:
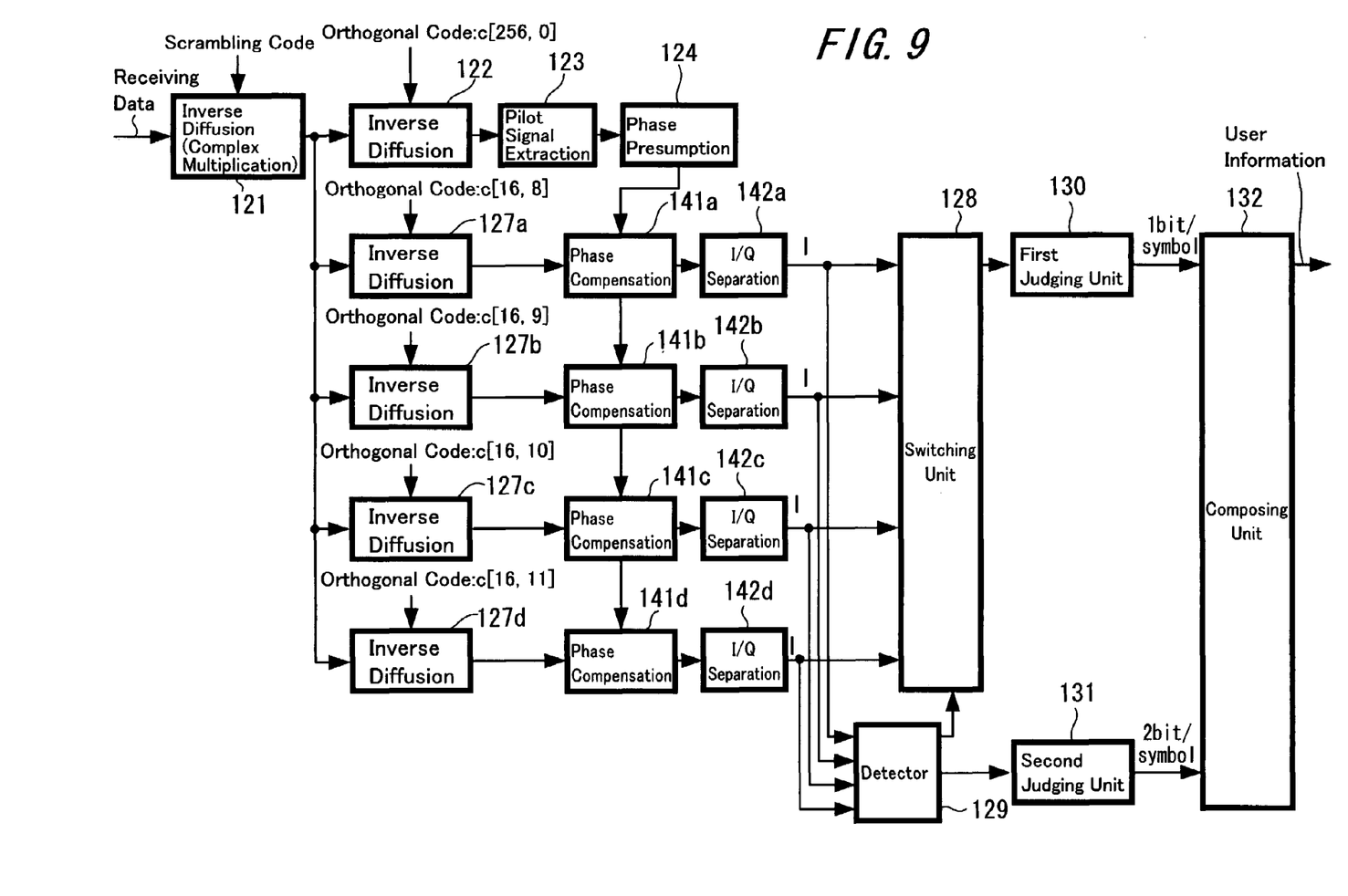
FIG. 9 is a block diagram showing another example (second example) of the receiving configuration according to an embodiment of the present invention.

Next, a second example of a reception configuration with respect to the configuration to receive the signal transmitted by the configuration shown in FIG. 4 is explained referring to FIG. 9. In FIG. 9, the same reference numerals are given to parts corresponding to those in FIG. 7 which shows the first example of the reception configuration.

Receiving data obtained by receiving a wireless signal is supplied to the descramble circuit 121, and a complex multiplication is performed using a scrambling code to obtain the descrambled receiving data. The obtained receiving data is supplied to the inverse diffusion circuit 122; the data is multiplied by the orthogonal code c [256, 0] which has been used for the diffusion of the control information on the transmitting side to be inversely diffused; and the inversely diffused signal is supplied to the pilot signal extraction unit 123 to extract a pilot signal contained in the control information. Based on the extracted pilot signal, a phase of the receiving signal is presumed in the phase presumption unit 124.

Then, the receiving data which is descrambled in the descramble circuit 121 is supplied to four inverse diffusion circuits 127a through 127d. In those four inverse diffusion circuits 127a through 127d, the same four orthogonal codes c [16, 8], c [16, 9], c [16, 10] and c [16, 11] as the four orthogonal codes which have been used on the transmitting side are prepared to perform inverse diffusion processing of multiplying the receiving data individually by the above codes in each of the inverse diffusion circuits 127a through 127d.

Four systems of receiving data which are inversely diffused individually are respectively supplied to different phase compensation units 141a through 141d to perform phase compensation processing of the inversely diffused receiving data based on the phase of the receiving signal which is presumed by the phase presumption unit 124. Then, each system of receiving data on which the phase compensation is performed is respectively supplied to orthogonal component separators 142a through 142d to extract an I-component among orthogonalized components. The extracted I-component of each system is supplied to the switching unit 128 and only one system of receiving data is selected. In order to make this selection, the receiving data output from each of the inverse diffusion circuits 127a through 127d is supplied to the detector 129 to judge which one among the four systems is the receiving data having been inversely diffused correctly, and the judged system of receiving data is selected in the switching unit 128. This detection in the detector 129 and this selection in the switching unit 128 are performed by the unit of one symbol.

The receiving data selected in the switching unit 128 is supplied to the first judging unit 130 to perform demodulation processing to judge the receiving data of one bit for one symbol and the judged one bit/one symbol is supplied to the composing unit 132.

Further, information on the correct receiving data series detected in the detector 129 is supplied to the second judging unit 131 to obtain data of two bits per one symbol from the orthogonal code which has been used for the inverse diffusion thereof based on the information on the correct receiving data series. The processing of obtaining this data of two bits per one symbol corresponds to that on the transmitting side of the two-bit data as the switching information of the orthogonal code and the orthogonal code to be used, and therefore, the original data of two bits/one symbol can be obtained based on the orthogonal code.

In case of the configuration of FIG. 9, the phase compensation is performed on a symbol level after performing the inverse diffusion in comparison to the configuration of FIG. 7; however, similar reception processing to the case of the reception configuration in FIG. 7 can be performed. According to the example of FIG. 9, the amount of reception processing can be reduced compared to that of the configuration of FIG. 7.

Figure 10:
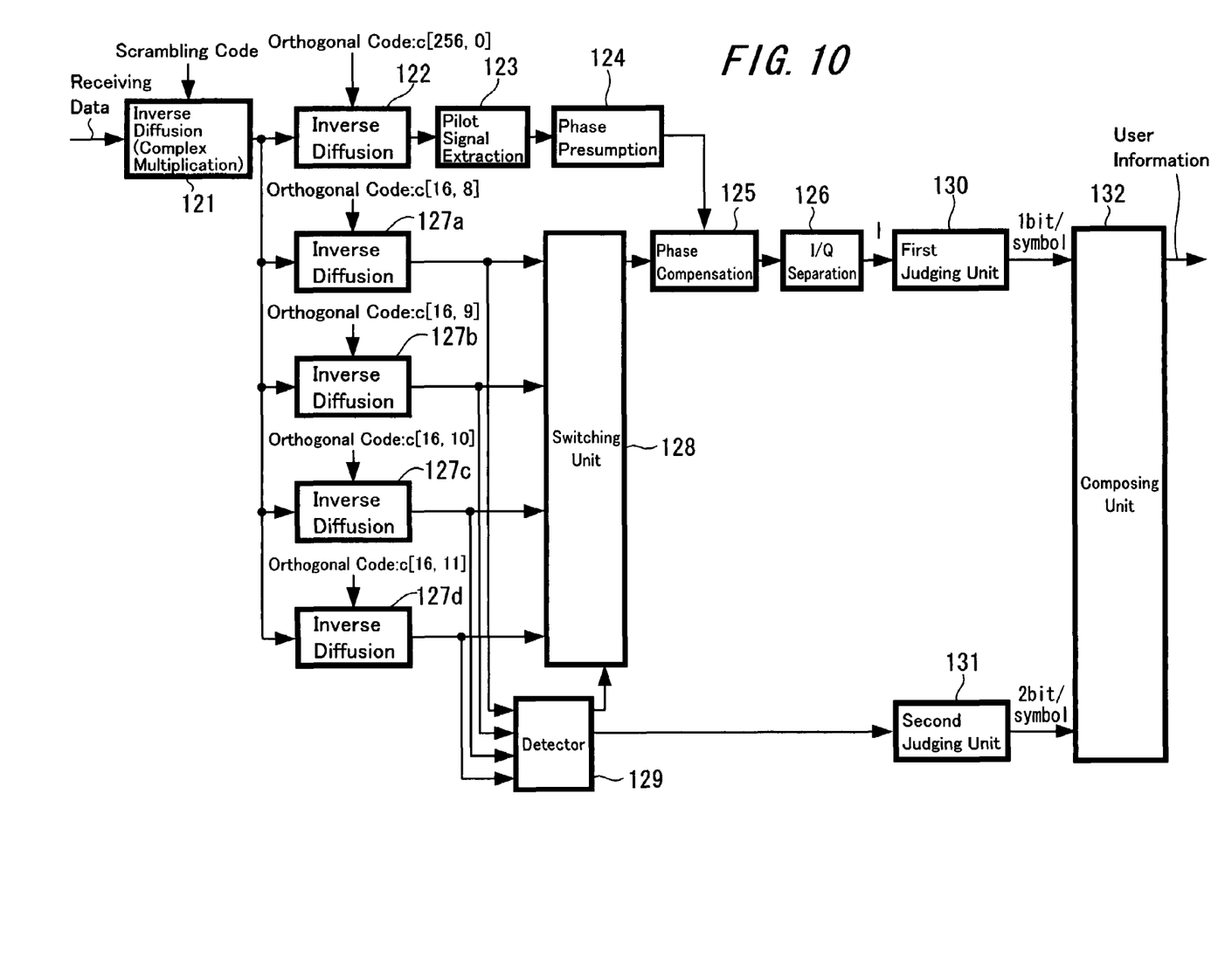
FIG. 10 is a block diagram showing another example of (third example) of the receiving configuration according to an embodiment of the present invention.

Next, a third example of a reception configuration with respect to the configuration to receive the signal transmitted by the configuration shown in FIG. 4 is explained referring to FIG. 10. In FIG. 10, the same reference numerals are given to parts corresponding to those in FIGS. 7 and 9 which show the first and second examples respectively of the reception configuration.

Receiving data obtained by receiving a wireless signal is supplied to the descramble circuit 121, and a complex multiplication is performed using a scrambling code to obtain descrambled receiving data. The obtained receiving data is supplied to the inverse diffusion circuit 122; inverse diffusion is performed by multiplying the data by the orthogonal code c [256, 0] which has been used for the diffusion of the control information on the transmitting side; and the inversely diffused signal is supplied to the pilot signal extraction unit 123 to extract a pilot signal contained in the control information. Based on the extracted pilot signal, a phase of the receiving signal is presumed in the phase presumption unit 124.

Then, the receiving data descrambled in the descramble circuit 121 is supplied to four inverse diffusion circuits 127a through 127d. In those four inverse diffusion circuits 127a through 127d, the same four orthogonal codes c [16, 8], c [16, 9], c [16, 10] and c [16, 11] as the four orthogonal codes which have been used on the transmitting side are prepared to perform inverse diffusion processing by multiplying the receiving data individually by the codes in each of the inverse diffusion circuits 127a through 127d.

Four systems of receiving data inversely-diffused individually are supplied to the switching unit 128 to select only one system of receiving data. In order to make this selection, the receiving data output from each of the inverse diffusion circuits 127a through 127d is supplied to the detector 129 to judge which one among the four systems is the receiving data having been inversely diffused correctly, and the judged system of receiving data is selected in the switching unit 128. This detection in the detector 129 and this selection in the switching unit 128 are performed by the unit of one symbol.

The receiving data selected in the switching unit 128 is supplied to the phase compensation unit 125 to perform phase compensation processing of the inversely diffused receiving data based on the phase of the receiving signal which is presumed in the phase presumption unit 124. Then, the phase-compensated receiving data is supplied to the orthogonal component separator 126 to extract an I-component among the orthogonalized components; the extracted I-component is supplied to the first judging unit 130 to perform demodulation processing to judge the receiving data of one bit for one symbol, and the judged one bit/one symbol data is supplied to the composing unit 132.

Further, information on the correct receiving data series which is detected in the detector 129 is supplied to the second judging unit 131 and data of two bits per one symbol is obtained from the orthogonal code which has been used for the inverse diffusion of the receiving data based on the information on the correct receiving data series. The processing of obtaining this data of two bits per one symbol corresponds to that on the transmitting side of the two bits data as the switching information of the orthogonal code and the orthogonal code to be used, and therefore, the original data of two bits/one symbol can be obtained based on the orthogonal code.

In case of the configuration of FIG. 10, the processing of selecting the correct receiving data is performed before performing the phase compensation and the separation processing of the orthogonal component, and the detection of the orthogonal code is judged by, for example, receiving power in the detector 129; however, the same reception processing as in the cases of FIGS. 7 and 9 can be performed. In case of the configuration of FIG. 10, an amount of reception processing can also be reduced compared to that of the configuration of FIG. 7.

In addition, although the orthogonal code to be used is switched by the unit of one symbol of the transmission signal in the above described embodiment, it is also possible to switch the orthogonal code for diffusion by the unit of a plurality of symbols such as two symbols. However, in case of the switching by the unit of the plurality of symbols, an amount of data to be transmitted based on the selection of the orthogonal code becomes less to that extent and a transmission rate becomes low.

Further, the number of bits per one symbol in data or the like which is explained in the above described embodiments also shows one example, and other number of bits may constitute each symbol. Moreover, although the modulation method on the transmitting side and the demodulation method on the receiving side are also not explained specifically in detail, various modulation methods and demodulation methods which have been conventionally applied to this kind of transmission can be applied.

Furthermore, although a series of processing which has been explained so far can be realized by using hardware, it is also possible to realize that by using software. When the series of processing is obtained using software, the above mentioned transmission apparatus and reception apparatus can be functionally obtained by installing a program constituting the software in a data processing apparatus such as a computer apparatus to execute the program by the computer apparatus or the like.

The invention claimed is:

1. A data reception method, comprising the steps of:
   receiving a modulated signal that had been diffused from first and second data rows separated by the unit of a predetermined symbol, using one of plural orthogonal codes selected in accordance with said second data row;
   inversely diffusing the received signal individually using a plurality of orthogonal codes that are the same orthogonal codes used to diffuse the signal that is received;
   selecting a signal inversely-diffused using a correct orthogonal code among said respective inversely-diffused receiving signals;
   demodulating said selected signal by a predetermined demodulation method to obtain a first receiving data row;
   obtaining a second receiving data row corresponding to the correct orthogonal code selected in said selection; and
   composing said first receiving data row and said second receiving data row to obtain receiving data.

2. The data reception method according to claim 1, wherein said plurality of orthogonal codes prepared in advance are codes of the same cycle.

3. A data transport method of transmitting data, comprising the steps of:
   on a transmitting side separating input data into a first data row and a second data row by the unit of a predetermined symbol,
   selecting one code among a plurality of orthogonal codes prepared in advance in accordance with said separated second data row and diffusing said first data row using the selected code, and
   modulating said diffused first data row by a predetermined modulation method to be transmitted;
   and on a receiving side receiving and inversely diffusing a transmitted signal individually using the same plurality of orthogonal codes as said first-mentioned orthogonal codes,
   selecting a signal inversely-diffused using a correct orthogonal code among said respective inversely-diffused receiving signals,
   demodulating said selected signal by a predetermined demodulation method to obtain a first receiving data row,
   obtaining a second receiving data row corresponding to the correct orthogonal code selected in said selection, and
   combining said first receiving data row and said second receiving data row to obtain receiving data.

4. The data transport method according to claim 3, wherein said plurality of orthogonal codes prepared on the transmitting side and on the receiving side are codes of the same cycle.

5. A data reception apparatus, comprising:
   means for receiving a modulated signal that had been diffused from first and second data rows separated by the unit of a predetermined symbol, using one of plural orthogonal codes selected in accordance with said second data row;
   means for performing individually an inverse diffusion of the received signal using a plurality of orthogonal codes that are the same orthogonal codes used to diffuse the signal that is received;

means for selecting a signal inversely-diffused using a correct orthogonal code among said respective inversely-diffused receiving signals;

means for demodulating the signal selected in said selection means using a predetermined demodulation method to obtain a first receiving data row; and means for obtaining a second receiving data row corresponding to the correct orthogonal code selected in the selection by said selection means and composing said first receiving data row and said second receiving data row to obtain receiving data.

6. The data reception apparatus according to claim 5, wherein said plurality of orthogonal codes prepared in advance are codes of the same cycle.

7. A data reception apparatus, comprising:
an inverse diffusion circuit to perform an inverse diffusion of a receiving signal individually using a plurality of orthogonal codes prepared in advance;
a selector to select a signal inversely-diffused using a correct orthogonal code among said respective inversely-diffused receiving signals;
a demodulator to demodulate the signal selected in said selector by a predetermined demodulation method to obtain a first receiving data row; and
a composing unit to obtain a second receiving data row corresponding to the correct orthogonal code selected in the selection in said selector and to compose said tint receiving data row and said second receiving data row to obtain receiving data.

8. A data transport system to transmit data, comprising:
on a transmitting side;
means for separating input data into a first data row and a second data row by the unit of predetermined symbol,
means fur selecting one code among a plurality of orthogonal codes prepared in advance in accordance with said second data row separated in said separation means and diffusing said first data row using the selected code, and
means for modulating the first data row diffused in said diffusion means by a predetermined demodulation method to obtain a transmitting signal;
and on a receiving side: means for performing an inverse diffusion individually using the same plurality of orthogonal codes as said orthogonal codes after receiving said transmitting signal,
means for selecting a signal inversely-diffused using a correct orthogonal code among said respective inversely-diffused receiving signals,
means for demodulating the signal selected in said selection means by a predetermined demodulation method to obtain a first receiving data row, and
means fur obtaining a second receiving data row corresponding to the correct orthogonal code selected in the selection in said selection means and composing said first receiving data row and said second receiving data row to obtain receiving data.

9. The data transport system according to claim 8, wherein said plurality of orthogonal codes prepared on the transmitting side and on the receiving side are codes of the same cycle.

10. A data transport system to transmit data, comprising:
on a transmitting side
a separator to separate input data into a first data row and a second data row by the unit of predetermined symbol,
a diffusion circuit to perform a diffusion of said first data row in accordance with said second data row separated in said separator using a corresponding code among a plurality of orthogonal codes prepared in advance, and
a modulation circuit to modulate the first data row diffused in said diffusion circuit by a predetermined modulation method to obtain a transmission signal;
and on a receiving side
an inverse diffusion circuit to perform an inverse diffusion individually using the same plurality of orthogonal codes as said orthogonal codes after receiving said transmitting signal,
a selector to select a signal inversely-diffused using a correct orthogonal code among said respective inversely-diffused receiving signals,
a demodulation unit to demodulate the signal selected in said selector by a predetermined demodulation method to obtain a first receiving data row, and
a composing unit to obtain a second receiving data row corresponding to the correct orthogonal code selected in the selection in said selector and to compose said first receiving data row and said second receiving data row to obtain receiving data.

11. A communication terminal comprising a data reception apparatus, comprising:
means for performing individually an inverse diffusion of a receiving signal using a plurality of orthogonal codes prepared in advance,
means for selecting a signal inversely-diffused using a correct orthogonal code among said respective inversely-diffused receiving signals,
means for demodulating the signal selected in said selection means by a predetermined demodulation method to obtain a first receiving data row, and
means for obtaining a second receiving data row corresponding to the correct orthogonal code selected by the selection in said selection means and composing said first receiving data row and said second receiving data row to obtain receiving data.

12. A communication terminal, comprising a data transmission apparatus including:
means for separating input data into a first data row and a second data row by a unit of predetermined symbol,
means for selecting one code among a plurality of orthogonal codes prepared in advance in accordance with said second data row separated in said separation means and diffusing said first data row using a selected code, and
means for modulating the first data row diffused in said diffusion means by a predetermined modulation method to obtain a transmitting signal; and
a data reception apparatus including: means for performing an inverse diffusion individually using the same plurality of orthogonal codes as said orthogonal codes after receiving said transmitting signal, means for selecting a signal inversely-diffused using a correct orthogonal code among said respective inversely-diffused receiving signals,
means for demodulating the signal selected in said selection means by a predetermined demodulation method to obtain a first receiving data row, and
means for obtaining a second receiving data row corresponding to the correct orthogonal code selected in the selection in said selection means and composing said first receiving data row and said second receiving data row to obtain receiving data.

* * * * *